United States Patent
Wu et al.

(10) Patent No.: US 10,979,201 B2
(45) Date of Patent: Apr. 13, 2021

(54) METHOD FOR CONFIGURING DATA RESOURCE MAPPING INFORMATION, BASE STATION, AND TERMINAL

(71) Applicant: ZTE CORPORATION, Guangdong (CN)

(72) Inventors: Hao Wu, Shenzhen (CN); YuNgok Li, Shenzhen (CN); Yijian Chen, Shenzhen (CN); Zhaohua Lu, Shenzhen (CN); Huahua Xiao, Shenzhen (CN); Yuxin Wang, Shenzhen (CN); Jianxing Cai, Shenzhen (CN); Yong Li, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 112 days.

(21) Appl. No.: 16/336,427

(22) PCT Filed: Nov. 10, 2017

(86) PCT No.: PCT/CN2017/110578
§ 371 (c)(1),
(2) Date: Aug. 1, 2019

(87) PCT Pub. No.: WO2018/059603
PCT Pub. Date: Apr. 5, 2018

(65) Prior Publication Data
US 2019/0394007 A1    Dec. 26, 2019

(30) Foreign Application Priority Data
Sep. 30, 2016  (CN) .......................... 201610879777.9

(51) Int. Cl.
*H04L 5/00* (2006.01)
*H04B 7/06* (2006.01)
*H04W 76/27* (2018.01)

(52) U.S. Cl.
CPC ......... *H04L 5/0057* (2013.01); *H04B 7/0626* (2013.01); *H04L 5/0048* (2013.01);
(Continued)

(58) Field of Classification Search
CPC ... H04L 5/0044; H04L 5/0048; H04L 5/0057; H04L 5/0094; H04L 5/0098
See application file for complete search history.

(56) References Cited

U.S. PATENT DOCUMENTS 9,059,824 B2    6/2015  Onggosanusi et al.
2011/0317657 A1* 12/2011  Chmiel ................ H04W 28/22
                                              370/331
(Continued)

FOREIGN PATENT DOCUMENTS

CN    104584476 A    4/2015
CN    105144609 A    12/2015

OTHER PUBLICATIONS

International Search Report and Written Opinion for International Appl. No. PCT/CN2017/110578, dated Jan. 25, 2018.

*Primary Examiner* — Gary Mui
(74) *Attorney, Agent, or Firm* — Foley & Lardner LLP (57) ABSTRACT

Provided in embodiments of the present disclosure are a method and device for configuring data resource mapping information, a base station, a terminal and a system, and a storage medium. The method includes that: a base station configures data resource mapping information for a terminal. The data resource mapping information includes: a state set including K data resource mapping parameter states; information for activating M data resource mapping parameter states among the K data resource mapping parameter states, where the activated data resource mapping parameter states are referred to as active data resource mapping states; and information for selecting L active data resource mapping (Continued)

states from the M active data resource mapping states to perform data resource mapping.

15 Claims, 4 Drawing Sheets

(52) U.S. Cl.
CPC .......... *H04L 5/0094* (2013.01); *H04L 5/0098* (2013.01); *H04W 76/27* (2018.02)

(56) References Cited

U.S. PATENT DOCUMENTS

| | | | |
|---|---|---|---|
| 2012/0287875 A1* | 11/2012 | Kim | H04W 76/27 370/329 |
| 2014/0044040 A1* | 2/2014 | Chen | H04J 11/005 370/328 |
| 2016/0105817 A1* | 4/2016 | Frenne | H04L 5/0053 370/252 |
| 2016/0127095 A1* | 5/2016 | Chen | H04W 28/22 370/329 |
| 2016/0277954 A1* | 9/2016 | Frenne | H04L 5/0057 |
| 2017/0195031 A1* | 7/2017 | Onggosanusi | H04L 5/0048 |
| 2018/0098346 A1* | 4/2018 | Liu | H04B 7/066 |
| 2019/0215096 A1* | 7/2019 | Kim | H04W 28/22 |
| 2019/0280803 A1* | 9/2019 | Muruganathan | H04W 72/042 |

\* cited by examiner

METHOD FOR CONFIGURING DATA RESOURCE MAPPING INFORMATION, BASE STATION, AND TERMINAL

CROSS REFERENCE TO RELATED APPLICATIONS

This is a U.S. National Stage Application, under 35 U.S.C. 371, of International Patent Application No. PCT/CN2017/110578, filed on Nov. 10, 2017, which claims priority to Chinese Patent Application No. 201610879777.9 filed on Sep. 30, 2016, contents of both of which are incorporated herein by reference in their entireties.

TECHNICAL FIELD

The present disclosure relates to the field of communications and in particular, to a method and device for configuring data resource mapping information, a base station, a terminal and a system.

BACKGROUND

In a wireless communication system, a transmitting terminal and a receiving terminal generally use multiple antennas for transmission and reception to obtain a higher rate. One principle of the multi-antenna technology is to use some characteristics of the channel to form multi-layer transmission that matches the characteristics of the channel. The radiation direction of a signal is very specific, which can effectively improve system performance and obtain significant performance improvement without increasing bandwidth and power. The multi-antenna technology is a very promising technology and is widely used in current systems. The data transmission performance of a multi-antenna system depends mainly on the measurement and feedback of channel information. Therefore, the measurement and feedback of channel information is the core content of the multi-antenna technology. How to ensure the accuracy, overhead and robustness of channel measurement and channel information feedback has become an important issue.

The measurement and feedback of channel state information (CSI) is designed to be relatively simple in the early LTE system version. However, as requirements on precision become higher and higher, the pilot overhead, feedback overhead and quantization complexity are not expected to increase significantly, as a result, CSI measurement and feedback technologies are becoming more and more complex for pursuing higher quantization efficiency. In addition, a large number of new designs have also been introduced due to the need to adapt to various scenarios and antenna configurations. In the related art, CSI measurement and quantitative feedback include the following basic contents: a CSI reference signal (CSI-RS), an aperiodic CSI-RS, and rate matching of the CSI-RS.

CSI-RS

The CSI-RS is used for measurement of downlink channel information. The CSI-RS is divided into two types: a non-precoded CSI-RS (NP CSI-RS) and a Beamformed CSI-RS (BFed CSI-RS). For the NP CSI-RS, the base station transmits the reference signal at all ports, the user receives the reference signal and performs measurement and feeds back channel information, and thus the base station obtains channel state information. For the BFed CSI-RS, the base station configures precoding matrices for different port groups and loads, on K sets of CSI-RS resources (K≥1), CSI-RS on the precoding matrices for transmission, and the user measures equivalent channels and feeds back the CSI of the best CSI-RS resource.

Aperiodic CSI-RS

In order to support MIMO transmission of more ports, the number of CSI-RS ports also increases, and the resulting CSI-RS overhead may also increase. In addition, due to the introduction of the BFed CSI-RS, a UE-specific precoding matrix may be configured for the CSI-RS. In this case, users using different CSI-RS precoding matrixes cannot share the same CSI-RS resource, and thus a large pilot overhead is caused when the number of users is large. The aperiodic CSI-RS is an effective way to reduce the pilot overhead. At the same time, the aperiodic CSI-RS can improve the use efficiency of CSI-RS through more flexible resource configuration. In the aperiodic CSI-RS scheme, the base station triggers transmission of the CSI-RS as needed. Resources occupied by the triggered CSI-RS are from a candidate CSI-RS resource set activated by the base station. The base station may activate and release the CSI-RS resource set by semi-configuration through higher-layer signaling or by dynamic configuration through physical layer signaling.

Rate Matching of the CSI-RS

In LTE, after the base station configures CSI-RS resources for terminals in the cell, for a certain terminal, the base station does not transmit data to other terminals on the resources on which the CSI-RS of the terminal is configured so as to reduce interference during CSI measurement. In a subframe, the base station transmits no data on resources in the subframe on which the CSI-RS is configured. For a periodic CSI-RS, since the CSI-RS resource configuration information and period information are both semi-statically configured, the base station may know in advance resources not for data transmission, can implement no data transmission on the resources in a manner of rate matching during channel coding, and only needs to configure the zero-power CSI-RS for other terminals on the corresponding resources. At this time, the rate matching information configured by the base station is semi-statically changed, and may be configured through radio resource control (RRC) signaling. In transmission mode 10 (TM10), in order to support more flexible configuration of CSI-RS resources and periods, a rate matching state set including 4 states may be configured by using RRC signaling, and a state is dynamically selected for rate matching from the configured state set by using physical layer signaling that includes a physical downlink shared channel (PDSCH) resource element (RE) mapping and quasi-co-location (QCL) indicator (PQI).

In the related art, the base station can only perform dynamic rate matching by using the PQI, so the rate matching is limited to only four states, which limits the flexibility of the aperiodic CSI-RS resource configuration.

No effective solution has yet been proposed for the above problem in the existing art.

SUMMARY

The embodiments of the present disclosure provide a method and apparatus for configuring data resource mapping information, a base station, a terminal and a system to at least solve the problem, in the existing art, that the base station can only perform dynamic rate matching by using the PQI, and then the flexibility of the aperiodic CSI-RS resource configuration is limited.

An embodiment of the present disclosure provides a method for configuring data resource mapping information. The method includes: configuring, by a base station, data resource mapping information for a terminal, where the data resource mapping information includes: a state set including K data resource mapping parameter states; information for activating M data resource mapping parameter states among the K data resource mapping parameter states, where activated data resource mapping parameter states are referred to as active data resource mapping states and $1 \leq M \leq K$; and information for selecting L active data resource mapping states from the M active data resource mapping states to perform data resource mapping, where $1 \leq L \leq M$.

Another embodiment of the present disclosure provides a method for configuring data resource mapping information. The method includes: obtaining, by a terminal, data resource mapping information configured by a base station for the terminal, where the data resource mapping information includes: a state set including K data resource mapping parameter states; information for activating M data resource mapping parameter states among the K data resource mapping parameter states, where the activated data resource mapping parameter states are referred to as active data resource mapping states and $1 \leq M \leq K$; and information for selecting L active data resource mapping states from the M active data resource mapping states to perform data resource mapping, where $1 \leq L \leq M$.

Another embodiment of the present disclosure provides a device for configuring data resource mapping information. The device is applied to a base station and includes a configuration module, which is configured to configure data resource mapping information for a terminal, where the data resource mapping information includes: a state set including K data resource mapping parameter states; information for activating M data resource mapping parameter states among the K data resource mapping parameter states, where the activated data resource mapping parameter states are referred to as active data resource mapping states and $1 \leq M \leq K$; and information for selecting L active data resource mapping states from the M active data resource mapping states to perform data resource mapping, where $1 \leq L \leq M$.

Another embodiment of the present disclosure provides a device for configuring data resource mapping information. The device is applied to a terminal and includes an obtaining module, which is configured to obtain data resource mapping information configured by a base station for the terminal. The data resource mapping information includes: a state set including K data resource mapping parameter states; information for activating M data resource mapping parameter states among the K data resource mapping parameter states, where the activated data resource mapping parameter states are referred to as active data resource mapping states and $1 \leq M \leq K$; and information for selecting L active data resource mapping states from the M active data resource mapping states to perform data resource mapping, where $1 \leq L \leq M$.

Another embodiment of the present disclosure provides a base station. The base station includes a processor, which is configured to configure data resource mapping information for a terminal, and a communication apparatus, which is configured to send the data resource mapping information to the terminal. The data resource mapping information includes: a state set including K data resource mapping parameter states; information for activating M data resource mapping parameter states among the K data resource mapping parameter states, where the activated data resource mapping parameter states are referred to as active data resource mapping states and $1 \leq M \leq K$; and information for selecting L active data resource mapping states from the M active data resource mapping states to perform data resource mapping, where $1 \leq L \leq M$.

Another embodiment of the present disclosure provides a terminal. The terminal includes a communication apparatus, which is configured to receive data resource mapping information sent by a base station; and a processor. The processor is configured to obtain, according to the data resource mapping information, a state set including K data resource mapping parameter states; information for activating M data resource mapping parameter states among the K data resource mapping parameter states, where the activated data resource mapping parameter states are referred to as active data resource mapping states and $1 \leq M \leq K$; and information for selecting L active data resource mapping states from the M active data resource mapping states to perform data resource mapping, where $1 \leq L \leq M$.

Another embodiment of the present disclosure provides a system for configuring data resource mapping information. The system includes: a base station and a terminal. The base station is configured to configure data resource mapping information for the terminal. The data resource mapping information includes: a state set including K data resource mapping parameter states; information for activating M data resource mapping parameter states among the K data resource mapping parameter states, where the activated data resource mapping parameter states are referred to as active data resource mapping states and $1 \leq M \leq K$; and information for selecting L active data resource mapping states from the M active data resource mapping states to perform data resource mapping, where $1 \leq L \leq M$. The terminal is configured to obtain the data resource mapping information configured by the base station for the terminal.

Another embodiment of the present disclosure further provides a storage medium. The storage medium is configured to store program codes for executing the step described below. A base station configures data resource mapping information for a terminal. The data resource mapping information includes: a state set including K data resource mapping parameter states; information for activating M data resource mapping parameter states among the K data resource mapping parameter states, where the activated data resource mapping parameter states are referred to as active data resource mapping states and $1 \leq M \leq K$; and information for selecting L active data resource mapping states from the M active data resource mapping states to perform data resource mapping, where $1 \leq L \leq M$.

Another embodiment of the present disclosure further provides a storage medium. The storage medium is configured to store program codes for executing the step described below. A terminal obtains data resource mapping information configured by a base station for the terminal. The data resource mapping information includes: a state set including K data resource mapping parameter states; information for activating M data resource mapping parameter states among the K data resource mapping parameter states, where the activated data resource mapping parameter states are referred to as active data resource mapping states and $1 \leq M \leq K$; and information for selecting L active data resource mapping states from the M active data resource mapping states to perform data resource mapping, where $1 \leq L \leq M$.

Through the embodiments of the present disclosure, the base station configures data resource mapping information for the terminal. The data resource mapping information includes: a state set including K data resource mapping parameter states; information for activating M data resource mapping parameter states among the K data resource mapping parameter states, where the activated data resource mapping parameter states are referred to as active data resource mapping states and $1 \leq M \leq K$; and information for selecting L active data resource mapping states from the M active data resource mapping states to perform data resource mapping, where $1 \leq L \leq M$. Therefore, with the technical solutions of the embodiments of the present disclosure, the active data resource mapping state may be flexibly selected for the data resource mapping, and the problem of limited flexibility of the aperiodic CSI-RS resource configuration since the base station can only use the PQI for dynamic rate matching is solved. The effect of ensuring flexibility of aperiodic CSI-RS resource configuration is achieved on the basis of not significantly increasing processing complexity of the terminal.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

The present disclosure will be described hereinafter in detail with reference to the drawings in conjunction with the embodiments. It is to be noted that if not in collision, the embodiments and features therein in the present disclosure may be combined with each other.

It is to be noted that the terms "first", "second" and the like in the description, claims and drawings of the present disclosure are used to distinguish between similar objects and are not necessarily used to describe a particular order or sequence.

Embodiment 1

Figure 1:
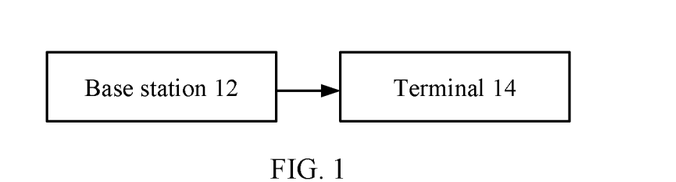
FIG. 1 is a diagram illustrating a network architecture according to an embodiment of the present disclosure.

FIG. 1 is a diagram illustrating a network architecture according to an embodiment of the present disclosure. As shown in FIG. 1, the network architecture includes: a base station 12 and a terminal 14. The base station 12 configures data resource mapping information for the terminal 14 and sends the data resource mapping information to the terminal 14. The terminal 14 receives the data resource mapping information, and then selects a active data resource mapping state in the same manner as the base station to perform data resource mapping.

Figure 2:
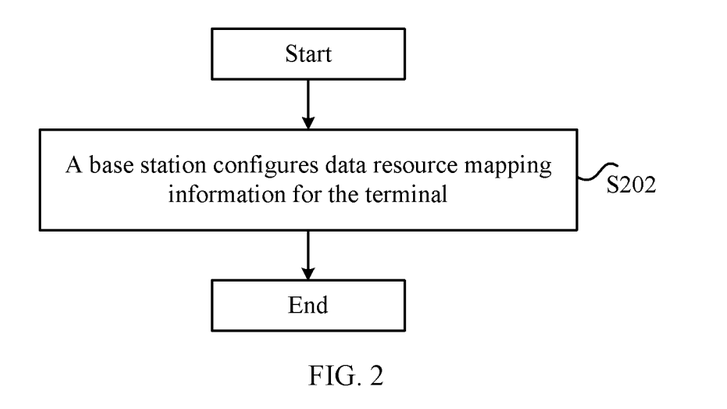
FIG. 2 is a flowchart (1) of a method for configuring data resource mapping information according to the embodiment of the present disclosure.

The embodiment provides a method for configuring data resource mapping information executed on the network architecture shown in FIG. 1. FIG. 2 is a flowchart (1) of the method for configuring data resource mapping information according to the embodiment of the present disclosure. As shown in FIG. 2, the method includes the step described below.

In step S202, the base station configures data resource mapping information for the terminal. The data resource mapping information includes: a state set including K data resource mapping parameter states; information for activating M data resource mapping parameter states among the K data resource mapping parameter states, where the activated data resource mapping parameter states are referred to as active data resource mapping states and $1 \leq M \leq K$; and information for selecting L active data resource mapping states from the M active data resource mapping states to perform data resource mapping, where $1 \leq L \leq M$.

In the embodiment, data resource mapping refers to rate matching. Through the rate matching, a non-zero power CSI-RS or a zero power CSI-RS is configured for a terminal in a cell, so that the terminal knows which resource element (RE) can be used for data reception and the interference in transmission of the CSI-RS is reduced.

Through the above steps, the base station configures data resource mapping information for the terminal. The data resource mapping information includes: a state set including K data resource mapping parameter states; information for activating M data resource mapping parameter states among the K data resource mapping parameter states, where the activated data resource mapping parameter states are active data resource mapping states and $1 \leq M \leq K$; and information for selecting L active data resource mapping states from the M active data resource mapping states to perform data resource mapping, where $1 \leq L \leq M$. Therefore, with the technical solutions of the present disclosure, the active data resource mapping state may be flexibly selected for performing data resource mapping, and the problem of limited flexibility of the aperiodic CSI-RS resource configuration since the base station can only use the PQI for dynamic rate matching is solved. The effect of ensuring flexibility of aperiodic CSI-RS resource configuration is achieved on the basis of not significantly increasing processing complexity of the terminal.

In an optional embodiment, the data resource mapping information further includes information for setting the active data resource mapping states to inactive data resource mapping states through deactivation signaling. In the embodiment, since the data resource mapping information includes the information for setting the active data resource mapping states to inactive data resource mapping states through deactivation signaling, certain active data resource mapping states are set to inactive data resource mapping states, which reduces signaling overhead and the complexity of implementation of the terminal.

In an optional embodiment, the data resource mapping information further includes: information for selecting N active data resource mapping states from the M active data resource mapping states. The N active data resource mapping states form a candidate data resource mapping state subset and $L \leq N \leq M$.

In an optional embodiment, the information for selecting the L active data resource mapping states from the M active data resource mapping states to perform the data resource mapping includes: information for selecting the L active data resource mapping states from the candidate data resource mapping state subset to perform the data resource mapping.

In an optional embodiment, when M=N, the candidate data resource mapping state subset includes all of the M active data resource mapping states; and/or when M>N, the candidate data resource mapping state subset includes part of the M active data resource mapping states.

In an optional embodiment, the base station selects N active data resource mapping states from the M active data resource mapping states in the data resource mapping information with a pre-defined rule by the base station and the terminal.

In an optional embodiment, the pre-defined rule includes at least one of: an order of activation time of the data resource mapping parameter states; and an order of configurations of the data resource mapping parameter states in the state set. In the present embodiment.

In an optional embodiment, the base station notifies the terminal of information of the candidate data resource mapping state subset.

In an optional embodiment, the data resource mapping parameter comprises a zero-power reference signal parameter.

In an optional embodiment, the data resource mapping information is sent to the terminal through physical layer signaling and/or higher-layer signaling.

In an optional embodiment, the higher-layer signaling includes: media access control (MAC) signaling or radio resource control (RRC) signaling.

Figure 3:
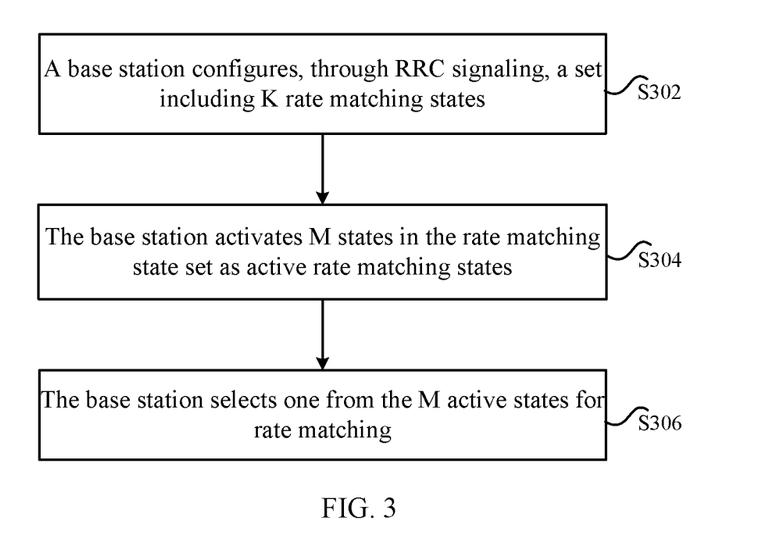
FIG. 3 is a flowchart (1) of a method for configuring data resource mapping information according to an optional embodiment of the present disclosure.

In an optional embodiment, FIG. 3 is a flowchart (1) of a method for configuring data resource mapping information according to the optional embodiment of the present disclosure. As shown in FIG. 3, the flowchart includes steps S302 to S306 which are specifically described below.

In step S302, a base station configures, through RRC signaling, a set including K rate matching states. In step S302, a value of K is 1, 2, 4, 8, etc., and the set of candidate states for rate matching is semi-statically configured in the step. In the aperiodic CSI-RS resource configuration, the base station configures K sets of candidate CSI-RS resources through RRC signaling, while in such a way the flexibility of the aperiodic CSI-RS resource configuration is limited to a certain extent, that is, the aperiodic CSI-RS resource configuration is not changed in a completely dynamic manner. Therefore, semi-static configuration of the K rate matching state sets through RRC signaling can greatly reduce the signaling overhead and the complexity of the terminal at the cost of losing some flexibility.

In step S304, the base station activates M states in the rate matching state set as active rate matching states. In step S304, M ones of the K states configured through the RRC signaling are activated in the MAC control element (MAC-CE) as the active rate matching states. The activation in this step S304 may be operated more dynamically than the semi-static configuration in step S302, so that a relatively flexible rate matching state selection can be ensured.

In step S306, the base station selects one of the M active states for rate matching. In step S306, one of the M active states is dynamically selected through downlink control information (DCI) signaling. The above operation can be performed by using the dynamic rate matching selection method through the PQI in TM10, and the value of M is 4.

In the above steps, some activated rate matching states may be deactivated through deactivation signaling, thereby reducing signaling overhead and implementation complexity of the terminal.

Figure 4:
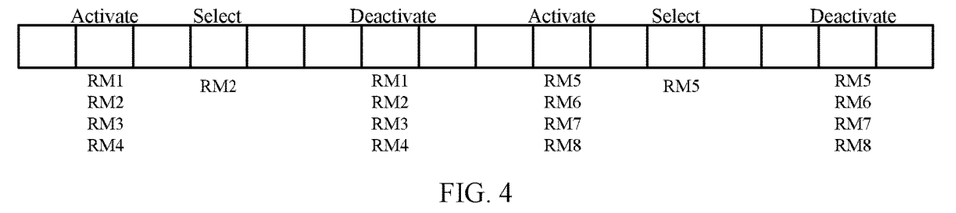
FIG. 4 is a schematic diagram of aperiodic CSI-RS rate matching according to an optional embodiment of the present disclosure.

In an optional embodiment, FIG. 4 is a schematic diagram (1) showing aperiodic CSI-RS rate matching according to the optional embodiment of the present disclosure. As shown in FIG. 4, the base station configures a set {RM1, RM2, . . . , RM8} including eight rate matching states through RRC signaling, activates four of the eight rate matching states in a subframe 2, selects one of the four rate matching states for performing rate matching on the CSI-RS in a subframe 4, deactivates the previously activated four states in a subframe 7, and subsequently activates and deactivates the other four states in similar manners as described above.

In the embodiment, through the above rate matching configuration, activation, and selection processes, greater flexibility can be ensured without increasing signaling overhead and implementation complexity of the terminal.

Figure 5:
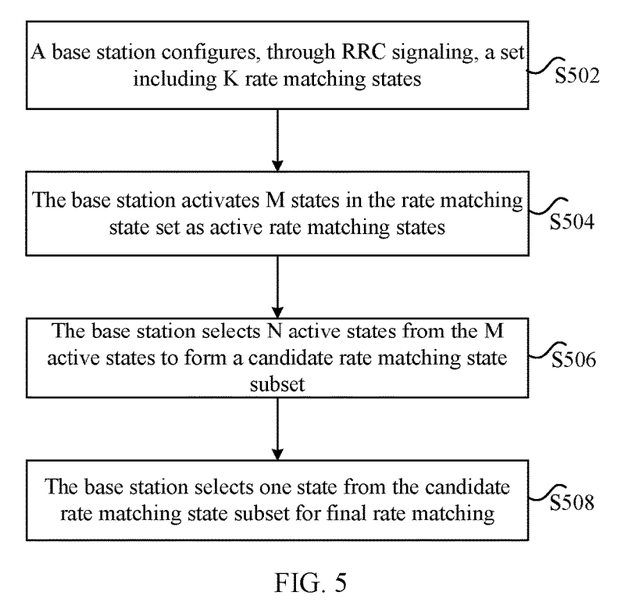
FIG. 5 is a flowchart (2) of a method for configuring data resource mapping information according to an optional embodiment of the present disclosure.

In an optional embodiment, FIG. 5 is a flowchart (2) of a method for configuring data resource mapping information according to the optional embodiment of the present disclosure.

As shown in FIG. 5, the method includes steps described below.

In step S502, a base station configures, through RRC signaling, a set including K rate matching states.

In step S504, the base station activates M states in the rate matching state set as active rate matching states.

In step S506, the base station selects N active states from the M active states to form a candidate rate matching state subset.

In step S508, the base station selects one state from the candidate rate matching state subset for final rate matching.

Through the above steps, greater flexibility is provided without breaking the existing DCI structure when the base station performs the rate matching state activation. If the base station selects one rate matching state by using a 2-bit PQI in the DCI, the PQI can indicate at most 4 states, while the number of active states can be flexibly changed according to the CSI-RS resource configuration. Therefore, the candidate rate matching state set may be formed by selecting N active states through the step S506. When N is always equal to M, the candidate rate matching state subset includes all active rate matching states. The technical solution at this case is the same as that in the embodiment illustrated in FIG. 4. The base station may select N ones from the M active states in a manner of signaling indication, and the signaling may be carried in the MAC-CE or the DCI.

Figure 6:
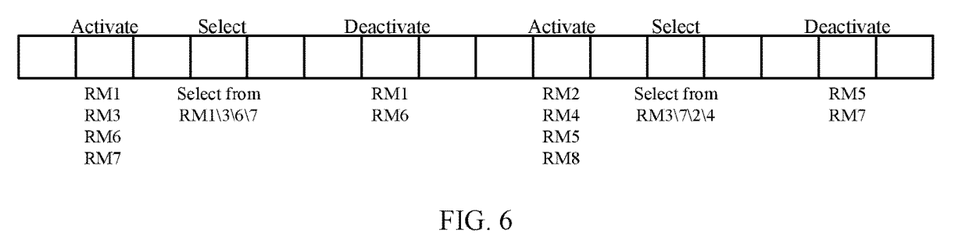
FIG. 6 is a schematic diagram illustrating selecting a candidate rate matching state subset in an order of activation time according to an optional embodiment of the present disclosure.
Figure 7:
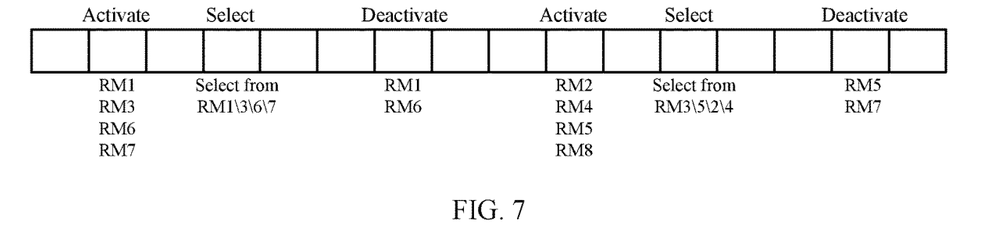
FIG. 7 is a schematic diagram illustrating selecting a candidate rate matching state subset in an order of configuration state IDs according to an optional embodiment of the present disclosure.

In order to reduce the feedback overhead, an optional implementation mode is to perform selection in an agreed manner. FIG. 6 and FIG. 7 show two manners of selecting the candidate rate matching state subset. As shown in FIG. 6 and FIG. 7, the base station activates four rate matching states in the subframe 2, deactivates only two states in the subframe 7, and activates another four states in a subframe 10. Therefore, six active states exist after the subframe 10, while only two-bit PQI in DCI can be used for state selection, so only four of the six activation states can be selected to form the candidate subset for DCI dynamic selection. In FIG. 6, states {RM3, RM7, RM2, RM4} are the states that are first activated, and therefore are selected as the candidate subset. Optionally, if the selection is in accordance with the most recently activated states, the candidate subset is {RM2, RM4, RM5, RM8}. In FIG. 7, the selection is made according to the activation state ID, and the candidate subset is {RM2, RM3, RM4, RM5}. The above-mentioned process of selecting states to form the candidate state subset is only preferred embodiments, and the present disclosure is not limited thereto.

With the above method, it is feasible to flexibly activate rate matching states the number of which is greater than the selection using the PQI, which improves the flexibility of configuring aperiodic CSI-RS resources in the network.

In an optional embodiment, in the LTE system, the user can dynamically select the rate matching state through the PQI only in the TM10, while in the TM9, the user can only configure the rate matching parameter through the higher-layer signaling. Therefore, in the TM9, the user cannot flexibly configure CSI-RS resources like in TM 10. For the user in TM9, an optional implementation mode is to configure the value of M to be 1. That is, the base station configures K rate matching states through RRC signaling, and each time one of the K states is activated through the MAC-CE to be the active rate matching state. When the CSI-RS transmission is triggered, the active rate matching state is used for rate matching. In another optional implementation mode, the base station configures K rate matching states through RRC signaling and configures M active states by using the MAC-CE, M is greater than 1. When transmission is triggered, one of the M states is selected in an agreed manner for rate matching, and the specified active state is deactivated through the MAC-CE. The agreed manner may be selecting based on the activation sequence as shown in FIG. 6, or may be selecting based on IDs of the activated states as shown in FIG. 7. In this way, for the TM9 in which the DCI does not support the rate matching state selection, the relatively flexible rate matching is also achieved for the aperiodic CSI-RS.

In an optional embodiment, when the CSI-RS transmission is triggered, selecting one state from the active states for rate matching is suitable for the aperiodic CSI-RS that is transmitted for a single time. For the CSI-RS that is transmitted for multiple times, each time the CSI-RS is triggered, the CSI-RS is transmitted continuously for a certain number of times according to a certain period. The transmission period T and the number L of transmissions may both be configured through higher-layer signaling. For the L transmissions of the CSI-RS, the same rate matching may be used. However, different terminals may have different periods, so a more flexible configuration is that the different rate matching parameters are used in the L transmissions. In the embodiment, the rate matchings in the L transmissions of the aperiodic CSI-RS can be implemented just by selecting L states for rate matching from the active rate matching states.

In an optional embodiment, in the LTE system, the parameters indicated by the PQI include the following types:
crs-PortsCount-r11.
crs-FreqShift-r11.
mbsfn-SubframeConfigList-r11.
csi-RS-ConfigZPId-r11.
pdsch-Start-r11.
qcl-CSI-RS-ConfigNZPId-r11.
zeroTxPowerCSI-RS2-r12

The parameters directly related to CSI-RS rate matching at least include the zero-power CSI-RS parameters including csi-RS-ConfigZPId-r11 and zeroTxPowerCSI-RS2-r12. When the base station performs rate matching for a terminal in a cell, the base station may configure zero-power CSI-RS resources for the terminal on the CSI-RS resources of other terminals in the cell to achieve the purpose of RE muting. Therefore, among the above parameters, the data resource mapping parameter of the CSI-RS may include at least zero-power CSI-RS related parameters. Therefore, in the embodiment, the data resource mapping parameter may be configured by using the PQI, and all the parameters described above are configured. The data resource mapping parameter may also not be configured by using the PQI, and the zero-power CSI-RS parameter is directly configured. The purpose of configuring the data resource mapping, i.e., rate matching parameter can be achieved in both the manners described above.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to each embodiment of the present disclosure.

Embodiment 2

Figure 8:
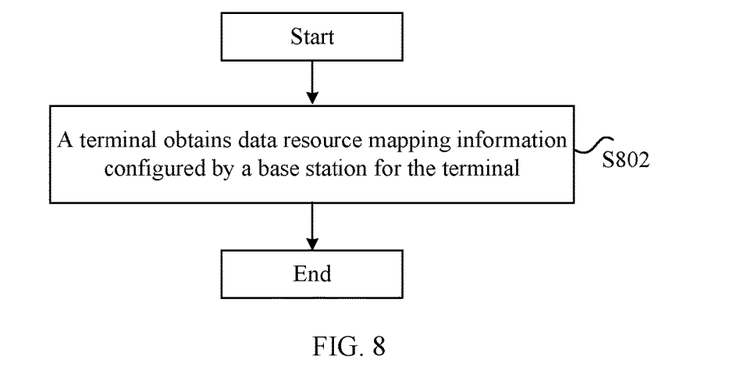
FIG. 8 is a flowchart (2) of a method for configuring data resource mapping information according to an embodiment of the present disclosure.

The embodiment provides a method for configuring data resource mapping information executed on the network architecture shown in FIG. 1. FIG. 8 is a flowchart (2) of the method for configuring data resource mapping information according to the embodiment of the present disclosure. As shown in FIG. 8, the method includes the step described below.

In step S802, a terminal obtains data resource mapping information configured by a base station for the terminal. The data resource mapping information includes: a state set including K data resource mapping parameter states; information for activating M data resource mapping parameter states among the K data resource mapping parameter states, where the activated data resource mapping parameter states are referred to as active data resource mapping states and $1 \leqslant M \leqslant K$ and information for selecting L active data resource mapping states from the M active data resource mapping states to perform data resource mapping, where $1 \leqslant L \leqslant M$.

Through the above steps, the terminal obtains the data resource mapping information configured by the base station for the terminal. The data resource mapping information includes: a state set including K data resource mapping parameter states; information for activating M data resource mapping parameter states among the K data resource mapping parameter states, where the activated data resource mapping parameter states are active data resource mapping states and $1 \leqslant M \leqslant K$; and information for selecting L active data resource mapping states from the M active data resource mapping states to perform data resource mapping, where $1 \leqslant L \leqslant M$. Therefore, with the technical solution of the present disclosure, the terminal can flexibly select the active data resource mapping state for performing data resource mapping, and the problem of limited flexibility of the aperiodic CSI-RS resource configuration since the base station can only use the PQI for dynamic rate matching is solved. The effect of ensuring flexibility of aperiodic CSI-RS resource configuration is achieved on the basis of not significantly increasing processing complexity of the terminal.

In an optional embodiment, the data resource mapping information further includes information for setting the active data resource mapping states to inactive data resource mapping states through deactivation signaling.

In an optional embodiment, the data resource mapping information further includes: information for selecting N active data resource mapping states from the M active data resource mapping states. The N active data resource mapping states form a candidate data resource mapping state subset and $L \leqslant N=M$.

In an optional embodiment, the information for selecting the L active data resource mapping states from the M active data resource mapping states to perform the data resource mapping includes: information for selecting the L active data resource mapping states from the candidate data resource mapping state subset to perform the data resource mapping.

In an optional embodiment, when M=N, the candidate data resource mapping state subset includes all of the M active data resource mapping states; and/or when M>N, the candidate data resource mapping state subset includes part of the M active data resource mapping states.

In an optional embodiment, the terminal selects N active data resource mapping states from the M active data resource mapping states in the data resource mapping information with a pre-defined rule by the base station and the terminal.

In an optional embodiment, the pre-defined rule includes at least one of: an order of activation time of the data resource mapping parameter states; and an order of configurations of the data resource mapping parameter states in the state set.

In an optional embodiment, a data resource mapping parameter includes a zero-power reference signal parameter.

In an optional embodiment, the terminal obtains the data resource mapping information configured by the base station for the terminal in the following manner: obtaining the data resource mapping information from the base station through physical layer signaling and/or higher-layer signaling.

In an optional embodiment, the higher-layer signaling includes: media access control (MAC) signaling or radio resource control (RRC) signaling.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to each embodiment of the present disclosure.

Embodiment 3

The embodiment further provides a device for configuring data resource mapping information. The device is used for implementing the above-mentioned embodiments and preferred implementation modes. What has been described will not be repeated. As used below, a term "module" may be software, hardware or a combination thereof capable of implementing predetermined functions. The device in the embodiment described below is preferably implemented by software, but implementation by hardware or by a combination of software and hardware is also possible and conceived.

Figure 9:
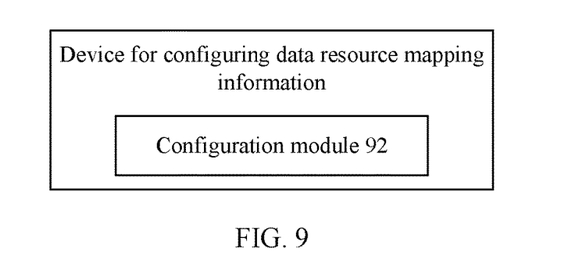
FIG. 9 is a structural block diagram (1) of a device for configuring data resource mapping information according to an embodiment of the present disclosure.

FIG. 9 is a structural block diagram (1) of the device for configuring data resource mapping information according to the embodiment of the present disclosure. As shown in FIG. 9, the device is applied to a base station and includes a configuration module 92, which is configured to configure data resource mapping information for a terminal. The data resource mapping information includes: a state set including K data resource mapping parameter states; information for activating M data resource mapping parameter states among the K data resource mapping parameter states, where the activated data resource mapping parameter states are referred to as active data resource mapping states and $1 \geqslant M \geqslant K$; and information for selecting L active data resource mapping states from the M active data resource mapping states to perform data resource mapping, where $1 \geqslant L \geqslant M$.

In an optional embodiment, the data resource mapping information further includes: information for selecting N active data resource mapping states from the M active data resource mapping states. The N active data resource mapping states form a candidate data resource mapping state subset and $L \geqslant N \geqslant M$.

In an optional embodiment, the information for selecting the L active data resource mapping states from the M active data resource mapping states to perform the data resource mapping includes: information for selecting the L active data resource mapping states from the candidate data resource mapping state subset to perform the data resource mapping.

Figure 10:
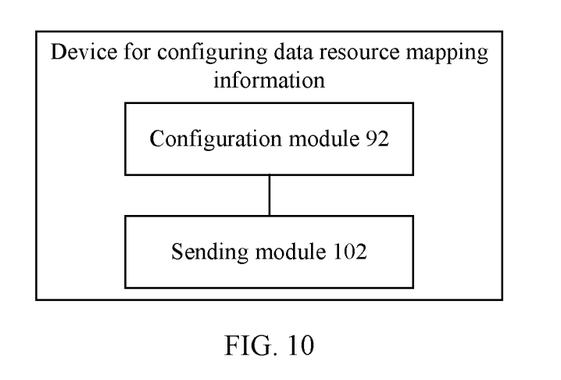
FIG. 10 is a structural block diagram of a device for configuring data resource mapping information according to an optional embodiment of the present disclosure.

In an optional embodiment, FIG. 10 is a structural block diagram of the device for configuring data resource mapping information according to the optional embodiment of the present disclosure. The device further includes: a sending module 102, which is configured to send the data resource mapping information to the terminal through physical layer signaling and/or higher-layer signaling.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment 4

The embodiment further provides a device for configuring data resource mapping information. The device is used for implementing the above-mentioned embodiments and preferred implementation modes. What has been described will not be repeated. As used below, a term "module" may be software, hardware or a combination thereof capable of implementing predetermined functions. The device in the embodiment described below is preferably implemented by software, but implementation by hardware or by a combination of software and hardware is also possible and conceived.

Figure 11:
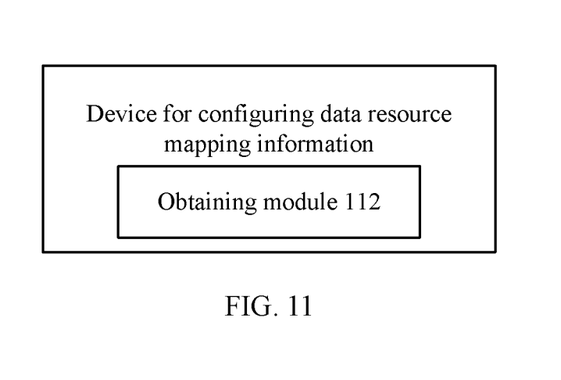
FIG. 11 is a structural block diagram (2) of a device for configuring data resource mapping information according to an optional embodiment of the present disclosure.

FIG. 11 is a structural block diagram (2) of the device for configuring data resource mapping information according to the embodiment of the present disclosure. As shown in FIG. 11, the device is applied to a terminal and includes an obtaining module 112, which is configured to obtain data resource mapping information configured by a base station for the terminal. The data resource mapping information includes: a state set including K data resource mapping parameter states; information for activating M data resource mapping parameter states among the K data resource mapping parameter states, where the activated data resource mapping parameter states are referred to as active data resource mapping states and $1 \leq M \leq K$; and information for selecting L active data resource mapping states from the M active data resource mapping states to perform data resource mapping, where $1 \leq L \leq M$.

In an optional embodiment, the data resource mapping information further includes: information for selecting N active data resource mapping states from the M active data resource mapping states. The N active data resource mapping states form a candidate data resource mapping state subset and $L \leq N \leq M$.

In an optional embodiment, the information for selecting the L active data resource mapping states from the M active data resource mapping states to perform the data resource mapping includes: information for selecting the L active data resource mapping states for data resource mapping from the candidate data resource mapping state subset.

In an optional embodiment, the obtaining module 112 is further configured to obtain the configured data resource mapping information from the base station through physical layer signaling and/or higher-layer signaling.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment 5

The embodiment provides a base station. The base station includes configured to configure data resource mapping information for a terminal. The data resource mapping information includes: a state set including K data resource mapping parameter states; information for activating M data resource mapping parameter states among the K data resource mapping parameter states, where the activated data resource mapping parameter states are active data resource mapping states and $1 \leq M \leq K$; and information for selecting L active data resource mapping states for data resource mapping from the M active data resource mapping states, where $1 \leq L \leq M$. The base station further includes a communication apparatus, which is configured to send the data resource mapping information to the terminal.

In an optional embodiment, the data resource mapping information further includes: information for selecting N active data resource mapping states from the M active data resource mapping states. The N active data resource mapping states form a candidate data resource mapping state subset and $L \leq N \leq M$.

The embodiment further provides a terminal. The terminal includes a communication apparatus, which is configured to receive data resource mapping information sent by a base station; and a processor. The processor is configured to obtain, according to the data resource mapping information, a state set including K data resource mapping parameter states; configured to activate information M data resource mapping parameter states among the K data resource mapping parameter states, where the activated data resource mapping parameter states are active data resource mapping states and $1 \leq M \leq K$; and configured to select information L active data resource mapping states for data resource mapping from the M active data resource mapping states, where $1 \leq L \leq M$.

In an optional embodiment, the data resource mapping information further includes: information for selecting N active data resource mapping states from the M active data resource mapping states. The N active data resource mapping states form a candidate data resource mapping state subset and $L \leq N \leq M$.

The embodiment further provides a system for configuring data resource mapping information. The system includes: a base station and a terminal. The base station is configured to configure data resource mapping information for the terminal. The data resource mapping information includes: a state set including K data resource mapping parameter states; information for activating M data resource mapping parameter states among the K data resource mapping parameter states, where the activated data resource mapping parameter states are active data resource mapping states and $1 \leq M \leq K$; and information for selecting L active data resource mapping states for data resource mapping from the M active data resource mapping states, where $1 \leq L \leq M$. The terminal is configured to obtain the data resource mapping information configured by the base station for the terminal.

Embodiment 6

The embodiment of the present disclosure further provides a storage medium. Optionally, in the embodiment, the storage medium may be configured to store program codes for executing the step described below. A base station configures data resource mapping information for a terminal. The data resource mapping information includes: a state set including K data resource mapping parameter states; information for activating M data resource mapping parameter states among the K data resource mapping parameter states, where the activated data resource mapping parameter states are active data resource mapping states and $1 \leq M \leq K$; and information for selecting L active data resource mapping states for data resource mapping from the M active data resource mapping states, where $1 \leq L \leq M$.

Optionally, the storage medium is further configured to store program codes for executing the step described below. The base station selects N active data resource mapping states from the M active data resource mapping states in the data resource mapping information with a pre-defined rule by the base station and the terminal.

Optionally, the storage medium is further configured to store program codes for executing the step described below. The base station notifies the terminal of information of the candidate data resource mapping state subset.

Optionally, the storage medium is further configured to store program codes for executing the step described below. The data resource mapping information is sent to the terminal through physical layer signaling and/or higher-layer signaling.

The embodiment of the present disclosure further provides a storage medium. Optionally, in the embodiment, the storage medium may be configured to store program codes for executing the step described below. A terminal obtains data resource mapping information configured by a base station for the terminal. The data resource mapping information includes: a state set including K data resource mapping parameter states; information for activating M data resource mapping parameter states among the K data resource mapping parameter states, where the activated data resource mapping parameter states are active data resource mapping states and $1 \leqslant M \leqslant K$; and information for selecting L active data resource mapping states for data resource mapping from the M active data resource mapping states, where $1 \leqslant L \leqslant M$.

Optionally, the storage medium is further configured to store program codes for executing the step described below. The terminal selects N active data resource mapping states from the M active data resource mapping states in the data resource mapping information with a pre-defined rule by the base station and the terminal.

Optionally, the storage medium is further configured to store program codes for executing the step of obtaining the data resource mapping information from the base station through physical layer signaling and/or higher-layer signaling.

Optionally, in the embodiment, the storage medium described above may include, but is not limited to, a USB flash disk, a read-only memory (ROM), a random access memory (RAM), a mobile hard disk, a magnetic disk, an optical disk or various other media capable of storing program codes.

Optionally, for specific examples in the embodiment, reference may be made to the examples described in the above-mentioned embodiments and optional implementation modes, and repetition will not be made in the embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

INDUSTRIAL APPLICABILITY

With the technical solutions of the embodiments of the present disclosure, the active data resource mapping state may be flexibly selected for the data resource mapping, and the problem of limited flexibility of the aperiodic CSI-RS resource configuration since the base station can only use the PQI for dynamic rate matching is solved. The effect of ensuring flexibility of aperiodic CSI-RS resource configuration is achieved on the basis of not significantly increasing processing complexity of the terminal.

What is claimed is:

1. A method for configuring data resource mapping information, comprising:
   configuring, by a base station, data resource mapping information for a terminal,
      wherein the data resource mapping information comprises:
      a state set comprising K data resource mapping parameter states;
      information for activating M data resource mapping parameter states among the K data resource mapping parameter states, wherein the activated data resource mapping parameter states are referred to as active data resource mapping states and $1 \leqslant M \leqslant K$; and
      information for selecting, from the M active data resource mapping states, L data resource mapping activated states for data resource mapping, wherein $1 \leqslant L \leqslant M$; and
   selecting, by the base station, N active data resource mapping states from the M active data resource mapping states in the data resource mapping information with a pre-defined rule,
      wherein the pre-defined rule comprises at least one of: an order of activation time of the data resource mapping parameter states; or an order of configuration of the data resource mapping parameter states in the state set, and wherein $N \leqslant M$.

2. The method of claim 1, wherein the data resource mapping information further comprises information for setting the active data resource mapping states to inactive data resource mapping states through deactivation signaling.

3. The method of claim 1, wherein the data resource mapping information further comprises: information for selecting N active data resource mapping states from the M active data resource mapping states, wherein the N active data resource mapping states form a candidate data resource mapping state subset and $L \leqslant N \leqslant M$.

4. The method of claim 3, wherein the information for selecting the L active data resource mapping states from the M active data resource mapping states to perform the data resource mapping comprises: information for selecting the L active data resource mapping states for the data resource mapping from the candidate data resource mapping state subset.

5. The method of claim 3, wherein
   when M=N, the candidate data resource mapping state subset comprises all of the M active data resource mapping states; and/or
   when M>N, the candidate data resource mapping state subset comprises part of the M active data resource mapping states.

6. The method of claim 3, further comprising: notifying, by the base station, the terminal of information of the candidate data resource mapping state subset.

7. The method of claim 1, wherein a data resource mapping parameter comprises a zero-power reference signal parameter.

8. A method for configuring data resource mapping information, comprising:
   obtaining, by a terminal, data resource mapping information configured by a base station for the terminal,
      wherein the data resource mapping information comprises:
      a state set comprising K data resource mapping parameter states;
      information for activating M data resource mapping parameter states among the K data resource mapping parameter states, wherein the activated data resource mapping parameter states are active data resource mapping states and $1 \leqslant M \leqslant K$; and information for selecting, from the M active data resource mapping states, L active data resource mapping states for data resource mapping, wherein $1 \leq L \leq M$; and selecting, by the terminal, N active data resource mapping states from the M active data resource mapping states in the data resource mapping information with a pre-defined rule, wherein the pre-defined rule comprises at least one of: an order of activation time of the data resource mapping parameter states; or an order of configuration of the data resource mapping parameter states in the state set, and wherein $N \leq M$.

9. The method of claim 8, wherein the data resource mapping information further comprises information for setting the active data resource mapping states to inactive data resource mapping states through deactivation signaling.

10. The method of claim 8, wherein the data resource mapping information further comprises: information for selecting N active data resource mapping states from the M active data resource mapping states, wherein the N active data resource mapping states form a candidate data resource mapping state subset and $L \leq N \leq M$.

11. The method of claim 10, wherein the information for selecting the L active data resource mapping states from the M active data resource mapping states for the data resource mapping comprises: information for selecting, from the candidate data resource mapping state subset, the L active data resource mapping states for the data resource mapping.

12. The method of claim 10, wherein
when M=N, the candidate data resource mapping state subset comprises all of the M active data resource mapping states; and/or
when M>N, the candidate data resource mapping state subset comprises part of the M active data resource mapping states.

13. The method of claim 8, wherein a data resource mapping parameter comprises a zero-power reference signal parameter.

14. A base station, comprising:
a processor configured to configure data resource mapping information for a terminal, wherein the data resource mapping information comprises: a state set comprising K data resource mapping parameter states; information for activating M data resource mapping parameter states among the K data resource mapping parameter states, wherein the activated data resource mapping parameter states are active data resource mapping states and $1 \leq M \leq K$; and information for selecting, from the M active data resource mapping states, L active data resource mapping states for data resource mapping, wherein $1 \leq L \leq M$, and to select N active data resource mapping states from the M active data resource mapping states in the data resource mapping information with a pre-defined rule, wherein the pre-defined rule comprises at least one of: an order of activation time of the data resource mapping parameter states; or an order of configuration of the data resource mapping parameter states in the state set, and wherein $N \leq M$; and
a communication apparatus, configured to send the data resource mapping information to the terminal.

15. A terminal for performing the method of claim 8, comprising:
a memory for storing processor-executable instructions; and
a processor, configured to execute the processor-executable instructions to perform the method of claim 8.

* * * * *